United States Patent
Lockhart

[19]

[11] Patent Number: 5,887,379
[45] Date of Patent: Mar. 30, 1999

[54] SPINNERBAIT WITH MOVABLE HEAD

[76] Inventor: Freeman Lockhart, 4403 Suzanne Ave., Texarkana, Tex. 75503

[21] Appl. No.: 825,561

[22] Filed: May 13, 1997

[51] Int. Cl.⁶ .................................................. A01K 85/08
[52] U.S. Cl. ............................................................ 43/42.13
[58] Field of Search ............................... 43/42.11, 42.13, 43/42.09, 42.19, 42.2, 42.21

[56] References Cited

U.S. PATENT DOCUMENTS

| | | |
|---|---|---|
| 2,633,659 | 4/1953 | Baum . |
| 2,741,057 | 4/1956 | Morris et al. . |
| 3,220,139 | 11/1965 | Bessler . |
| 3,344,549 | 10/1967 | Peters et al. . |
| 3,680,247 | 8/1972 | McKenzie . |
| 4,121,366 | 10/1978 | McClellan . |
| 4,223,469 | 9/1980 | Luz . |
| 4,536,986 | 8/1985 | Stout ........................................ 43/42.11 |
| 5,564,218 | 10/1996 | Kato ......................................... 43/42.13 |
| 5,605,004 | 2/1997 | Boullt et al. ........................ 43/44.83 X |

*Primary Examiner*—Thomas Price
*Attorney, Agent, or Firm*—Zarley, McKee, Thomte, Voorhees & Sease; Dennis L. Thomte

[57] ABSTRACT

An improved spinnerbait and buzzbait are assembled with a bent wire having a medial bend for securing to a fish line and a pair of legs diverging outwardly from the medial bend. A blade is rotatably connected to the blade leg for spinning movement of the blade. The hook leg eliminates the fixed molded lead head connection of a fish hook to the bent wire and substitutes a movable connection enabling replacement of the fish hook. A cotter pin style flexible bend in the hook leg defines a fixed leg portion and a free leg portion which are capable of being pinched together for receipt within the bore of a steel or non-lead head. An interference device resists movement of the head from the position over the legs of the cotter pin bend.

25 Claims, 3 Drawing Sheets

SPINNERBAIT WITH MOVABLE HEAD

BACKGROUND OF THE INVENTION

1. Technical Field

This invention is directed generally to spinnerbaits and buzzbaits and, more particularly, to such baits having a movable non-molded head and a hook movably connected to the bent wire.

2. Description of the Prior Art

Lures resembling spinnerbaits have been popular and in the same general design since the early 1900's. The safety-pin spinnerbait is perhaps the most versatile fish catcher ever devised. It acquired the name "safety-pin spinners" because the wire that connects the blade and leadhead resembles an open safety-pin. This lure can be worked successfully on top of the water, on the bottom or anywhere in between and will take almost every fresh or saltwater species. On the retrieve, a spinnerbait can be ripped, slow-rolled, bounced along the bottom, dropped along a ledge, buzzed on the surface, fished stop-and-go, or merely cast out and cranked straight in. It is difficult to fish a spinnerbait incorrectly. The spinnerbait is relatively trouble-free on the retrieve because it is quite snagless.

Likewise, the most common buzzbaits are made on a bent-wire form that resembles a "J" lying on its side, with the longer end of the shaft holding the molded head and skirted hook, and the upper, or shorter, arm supporting a spinning propeller blade.

Whereas spinnerbaits and buzzbaits are designed primarily for bass, both work well for a host of other, primarily freshwater, game fish, including walleye, muskie, pike and crappie.

Like fly tying, there are multiple ways of making and dressing leadhead spinnerbaits and buzzbaits. Important variables are wire design and choice of blade. New dressing materials, new paints that bond to leadheads, the ever-increasing selection of spinner blades and the availability of inexpensive molds of good quality open up almost infinite possibilities for anglers. All of these possibilities, however, include a fishhook fixed to a bent wire by molding the hook and wire with molten lead, tin or some metal alloy poured into a mold of some configuration.

Despite the immense popularity of this lure, the fixed molded connection of the hook and bent wire has certain disadvantages. First, the most common material for the molded head is lead. There is growing concern and activity in the fishing industry advocating the elimination of lead from fishing products. Secondly, because the hook is molded directly to the bent wire, the hook is not replaceable or interchangeable. Changing the hook generally required substituting an entire spinnerbait or buzzbait. Thirdly, the rigid connection of the hook and bent wire decreases the action and vibration which attract fish. Fourthly, the fixed hook can increase the chance that a fish will become unhooked because the fighting fish can use the fixed spinnerbait for leverage. Fifthly, the fixed molded spinnerbait increases the chances that a fish will deform the bent wire, likewise because the fighting fish can use the spinnerbait for leverage. Sixthly, the fixed spinnerbaits cannot be used without a hook for pre-fishing for a tournament, for example, since the hook is a permanently molded part of the lure.

Further, the molding of the head over a portion of the hook shank shortens the length of the exposed portion of the hook, often requiring a stringer or trailer hook and the snagging and alignment problems associated with it.

Finally, a problem with conventional molded leadhead spinnerbaits and buzzbaits is the required molding operation itself. Required tools include a furnace, pot, ladles and safety equipment. The molding process itself takes much time and skill. The mold must be preheated sufficiently that the lead or other molten metal fills the cavity evenly but not so hot as to be dangerous or warp the mold. Because the wires or hooks extend into the molding area and out from the sides, it may be difficult to support the mold. The time and labor required for the molding step likewise increase the cost of the resulting lure.

Accordingly, a primary object of the invention is to provide improved spinnerbaits and buzzbaits.

Another object is to provide improved spinnerbaits and buzzbaits which are free of lead material.

Another object is to provide improved spinnerbaits and buzzbaits which eliminate the need for molding the hook and bent wire together.

Another object is to provide improved spinnerbaits and buzzbaits wherein the fish hook is replaceable and interchangeable.

Another object is to provide improved spinnerbaits and buzzbaits with increased vibration and action in the water for better attraction of fish.

Another object is to provide improved spinnerbaits and buzzbaits which help prevent fish from becoming unhooked from the lure.

Another object is to provide improved spinnerbaits and buzzbaits which decrease the chance of a fish bending the wire of the lure.

Another object is to provide improved spinnerbaits and buzzbaits which may be used with or without a hook.

Another object is to provide improved spinnerbaits and buzzbaits with a longer exposed hook shank to eliminate the need for a stringer or trailer.

Finally, it is an object of the invention to provide improved spinnerbaits and buzzbaits which are simple and rugged in construction, economical to manufacture and efficient in operation.

SUMMARY OF THE INVENTION

The improved bent wire fishing bait of the invention may be either a spinnerbait or a buzzbait. In either case, it includes a bent wire having a medial bend for securement to a fish line and a pair of legs including a hook leg and a blade leg diverging outwardly from the medial bend. A blade is rotatably connected to the blade leg for spinning movement of the blade. The hook leg is extended through the opening of a head for slidably mounting the head on the hook leg. The hook leg has a fixed leg portion, a flexible bend and a free end portion joined to the fixed leg portion by the bend. The free end portion is of shorter length than the fixed leg portion and is bent back toward the fixed leg portion in a cotter pin shaped bend for replaceably receiving a fish hook on the flexible bend. The free end portion of the hook leg is movable to a position adjacent the fixed leg portion for slidable movement of the head to a hook retaining position over both leg portions. Mechanical interference such as a bend is strategically situated along the fixed leg portion of the hook leg for resisting sliding movement of the head from the hook retaining position.

The second bend forming the mechanical interference is spaced from the flexible cotter pin bend by a distance greater than the length of the opening through the head and is spaced from the end of the free end portion by a distance less than the length of the opening in the head so that the bend is positioned to resist movement of the head from the hook retaining position.

Because the cotter pin bend defines a partial loop having a width greater than the width of the opening in the head, it blocks movement of the head past the cotter pin bend.

In the spinnerbait embodiment, the blade leg is generally straight and has an eyelet formed on the free end for connection to a blade with a swivel connector.

In the buzzbait embodiment, the blade leg is generally J-shaped and includes a spacer leg extending generally perpendicular to the hook leg and a spinner leg connected to the spacer leg and extended toward the cotter pin bend generally parallel to the hook leg. A blade is mounted for rotation about the axis of the spinner leg and has outer wings bent in opposite direction to cause spinning of the blade in response to movement of the buzzbait through water.

The head is preferably made of steel or brass and thereby eliminates lead material from the lure. Upon forcing the head up the hook leg past the interference bend, the cotter pin bend opens to enable the hook to be replaced or interchanged with a different style hook, whereupon the head can be slid back down past the interference bend to retain the new hook on the lure. A skirt may be provided over the head of the cotter pin bend if desired.

DESCRIPTION OF THE PREFERRED EMBODIMENTS

Figure 1:
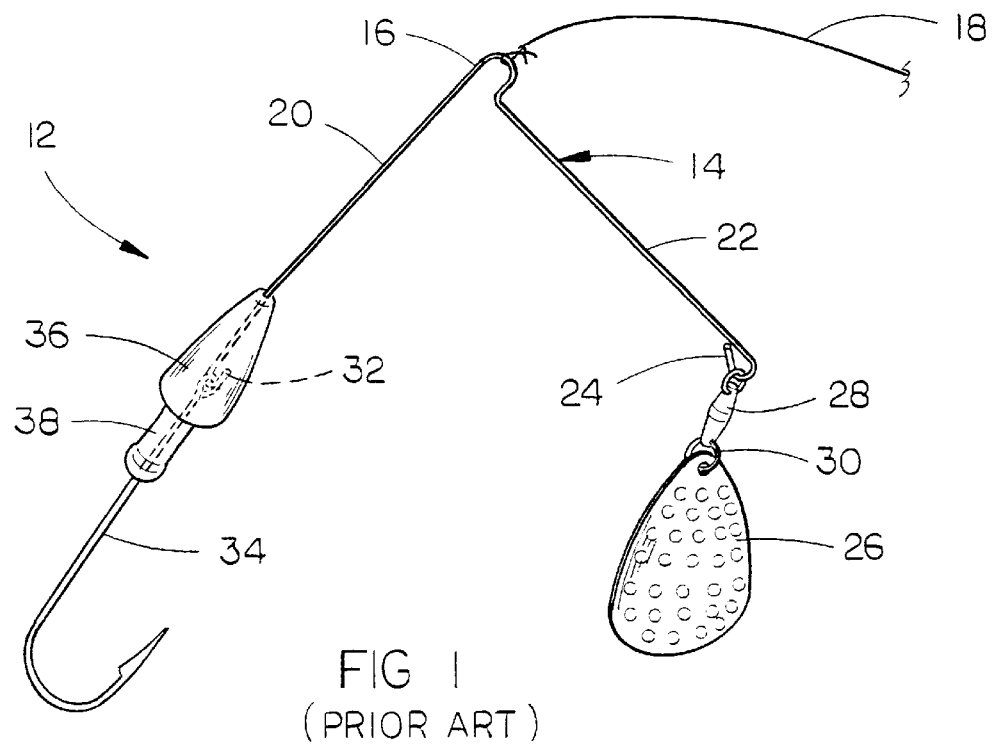
FIG. 1 is a perspective view of a molded leadhead spinnerbait of the prior art.
Figure 2:
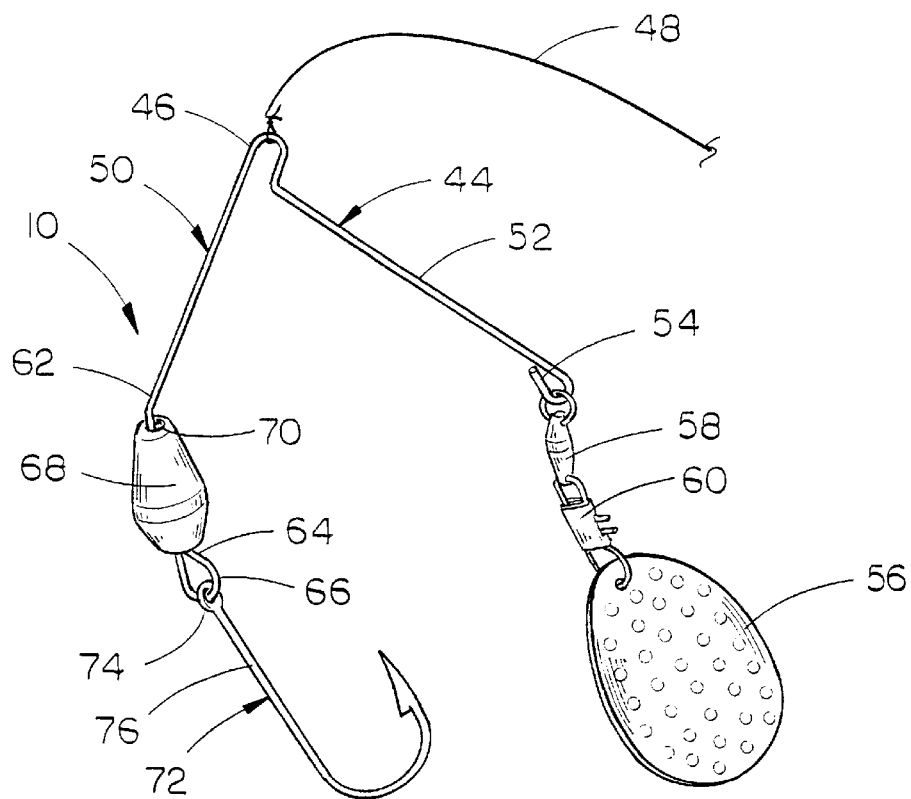
FIG. 2 is a perspective view of the improved spinnerbait of the invention.
Figure 3:
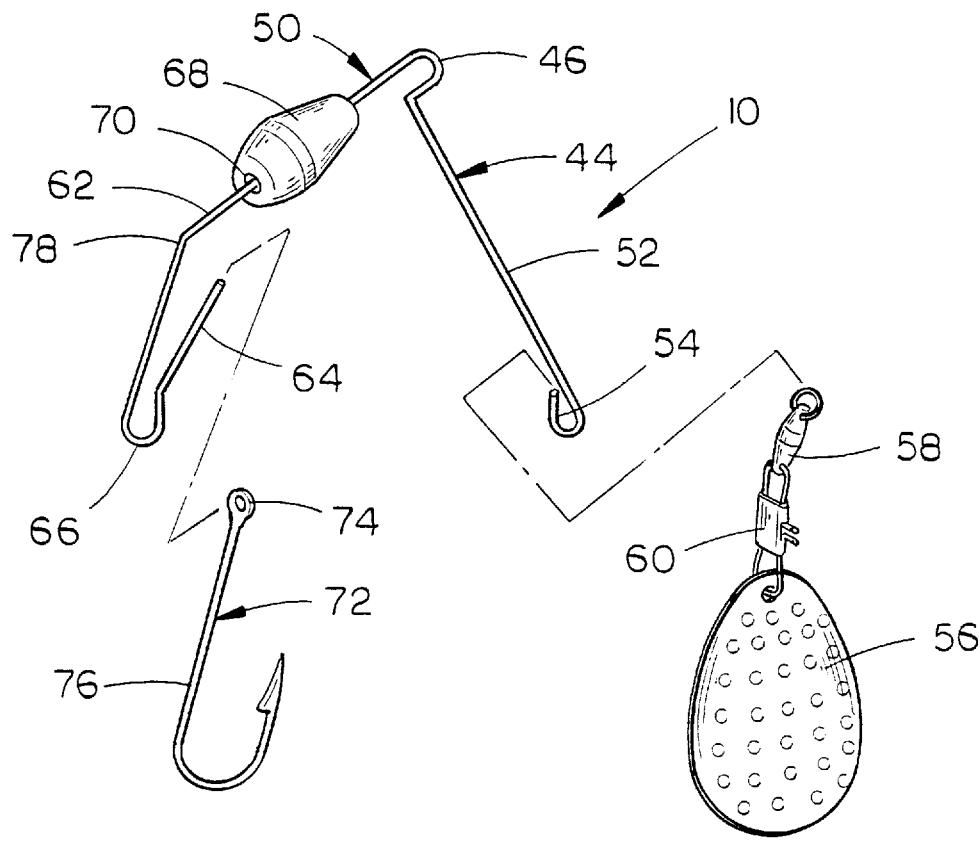
FIG. 3 is an exploded perspective view of the spinnerbait of the invention.

The improved spinnerbait 10 of the present invention is illustrated in FIGS. 2 and 3. The improvements can best be understood in comparison to a conventional molded leadhead spinnerbait 12 of the prior art, as illustrated in FIG. 1. That lure includes a bent wire 14 having a medial bend 16 for connection to a fish line 18 and two legs, a hook leg 20 and a blade leg 22 diverging outwardly approximately 80° to 90° apart so as to resemble an open safety-pin. The end of the blade leg 22 is formed in an eyelet 24 for connection to blade 26 by a swivel connector 28 and split ring 30. The free end of the hook leg 20 is bent into an open hook 32 for receiving the eyelet on the shank end of the fish hook 34 prior to placement of that connection in a mold for forming a fixed leadhead 36 around that connection. The fish hook 34 is thus rigidly connected to the bent wire 14. The leadhead 36 may be formed with an optional neck 38 for attaching a skirt over the hook.

The many disadvantages of the lead material and fixed permanent connection between hook 34 and bent wire 14 are discussed above.

Those problems are resolved by the improved spinnerbait 10 of the invention. Referring to FIGS. 2 and 3, spinnerbait 10 is built on a new bent wire 44 having a medial bend 46 for securement to a fish line 48. Whereas the R-shaped bend is illustrated, it could alternately be a closed loop, open loop or any other bend establishing an angular relation between the hook leg 50 and blade leg 52 while enabling connection to a fish line 48.

The free end of blade leg 52 is formed into an eyelet 54 for interchangeable connection to a selected blade 56 by a swivel connector 58 and an interlock snap 60. The interlock snap 60 facilitates easy exchange or replacement of the blade 56 by a fisherman wishing to experiment or to adapt to different environments or species of fish. Whereas the interlock snap 60 is illustrated, any connector designed for quick disconnect and reconnection to a substitute blade could be substituted for the interlock snap.

The hook leg 50 of the present invention differs significantly from the prior art by providing a fixed leg portion 62 which is joined to a free end portion 64 by a flexible bend 66. A preferred bend is the cotter pin style bend illustrated in the drawings.

A solid head 68 of steel, brass or other heavy material has an axial bore or other opening 70 through it for receiving the hook leg 50. The head 68 is preferably placed on the bent wire prior to formation of the cotter pin bend 66. The cotter pin bend is biased to the open position as shown in FIG. 3 to enable a fish hook 72 to have its shank eyelet 74 placed onto the free end portion 14 for support of the hook 72 on the flexible bend 66. Because the diameter of the fish hook eyelet 74 is greater than the diameter of the bent wire 44, the hook is free to rotate both about the axis of the eyelet 74 as well as about the axis of the hook shank 76.

To secure the hook 72 on the spinnerbait 10, the free end portion 64 is simply pinched closed to a position adjacent the fixed leg portion 62, whereupon the head 68 is slid down the hook leg 50 to receive both the fixed leg portion 62 and free end portion 64 within the central bore as shown in FIG. 2. This is defined as the hook retaining position.

To resist movement of the head from the hook retaining position, an interference means such as second bend 78 is provided on the fixed leg portion 62. The second bend 78 causes the fixed leg portion to define an angle of between 20° and 70° and preferably between 40° and 50°. Likewise, the second bend is resilient so that the head 68 can be forced over or past the second bend 78 to enable opening of the cotter pin bend 66 when the fisherman desires to change the hook 72. Upon replacement of the hook and sliding movement of the head downwardly to the hook retaining position, the resilient or spring nature of the bent wire 44 causes the second bend 78 to return to its originally formed angle.

Whereas the interference means is illustrated as second bend 78, other structures are possible, such as a fixed bead on the fixed leg portion 62 which is of a diameter to create a friction fit yet still enable sliding movement of the head over the bead. Similarly, any other type of attachment or bend which would resist sliding movement of the head 68 past it could be substituted to accomplish the function of the second bend 78.

The position of the interference means is related to its function for resisting sliding movement of the head from the hook retaining position. The second bend 78 is preferably spaced from the flexible bend 66 by a distance greater than the length of the opening 70 through the head 68 and it is spaced from the end of the free end portion 64 by a distance less than the length of the opening 70 through the head 68. Accordingly, even if sliding movement of the head is provided for in the hook retaining position, movement of the head toward the R-bend 46 to the extent that the flexible bend 66 snaps open is resisted.

The bent wire 44 for a spinnerbait is generally of a diameter of 0.035, 0.036 or 0.040 inches. This is the same type of wire used for conventional spinnerbaits.

Likewise, the blades 56 for the spinnerbait 10 are the same as those used for conventional spinnerbaits and for conventional spinners. The same colors, size, finishes and styles are all suitable for use with the present invention. Typical blades for spinnerbaits would include the standard willowleaf, Indiana, Colorado, and swing blades, although deep-cut blades, ribbed blades and fluted blades are usable as well. In most cases, larger blades are used on single-spin spinnerbaits whereas smaller blades are used on the twin-spin style, while tandem spinnerbaits may use one larger blade on the back and a small one in the front. All of these types of blade arrangements are suitable for use with the spinnerbait 10 of the invention.

Figure 4:
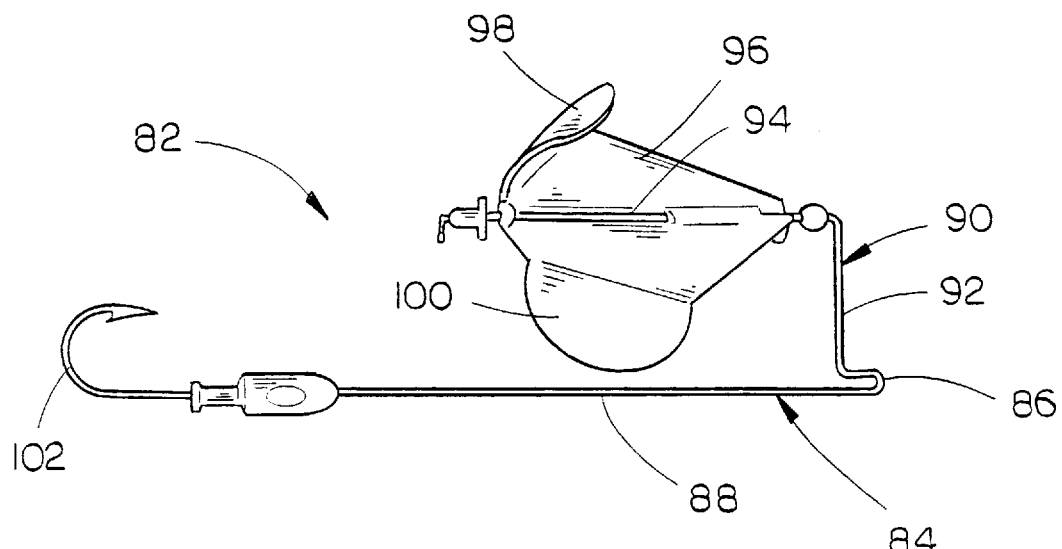
FIG. 4 is a plan view of a molded leadhead buzzbait of the prior art.
Figure 5:
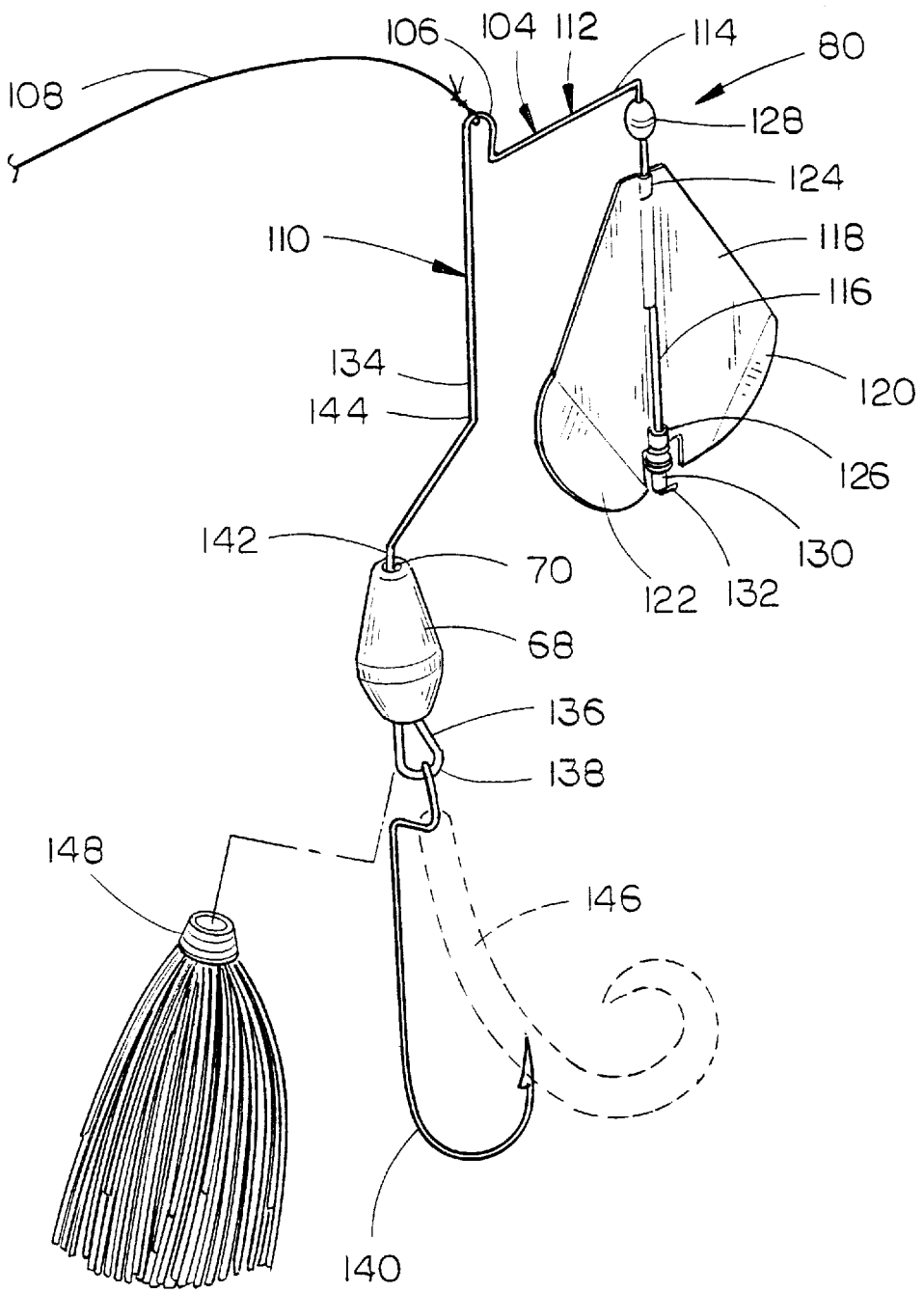
FIG. 5 is a perspective view of the improved buzzbait of the invention showing an optional skirt attachment and an optional trailer attached to the hook in a manner to render the bait essentially weedless.

FIG. 5 illustrates the improved buzzbait of the invention. Again, its structure and advantages are best understood in comparison to a conventional buzzbait 82 of the prior art, as illustrated in FIG. 4. The prior art buzzbait includes a bent wire 84 having a medial bend 86 for connection to a fish line. A hook leg 88 and blade leg 90 diverge outwardly from the medial bend 86 at an angle of approximately 90°. The blade leg 90 has a generally J-shape including a spacer leg 92 extending generally perpendicular to the hook leg 88 and a spinner leg 94 connected to the spacer leg 92 and extending away from the medial bend 86 generally parallel to the hook leg 88. A blade 96 is mounted for rotation about the axis of the spinner leg 94 and has outer wings 98 and 100 bent in opposite directions to cause spinning of the blade 96 as the buzzbait is pulled through the water. Referring to the hook leg 88, a fish hook 102 is permanently molded onto the hooked end of the hook leg 88 in the same manner illustrated in connection with the prior art spinnerbait of FIG. 1. The hook is thus fixed relative to the bent wire 84 and is not replaceable.

Referring to the improved buzzbait 80 of FIG. 5, the modified bent wire 104 has a similar medial bend 106 for securement to a fish line 108 and a hook leg 110 and a blade leg 112 which diverge outwardly from the medial bend 106 at an angle of approximately 90°. The blade leg 112 has the generally J-shape including a spacer leg 114 extending generally perpendicular to the hook leg 110 and the spinner leg 116 connected to the spacer leg 114 and extending away from the medial bend 106 generally parallel to the hook leg 110. A blade 118 is mounted for rotation about the axis of the spinner leg 116 and has outer wings 120 and 122 bent in opposite directions to cause spinning of the blade 118 as the buzzbait 80 is pulled through the water. The blade 118 may be provided with bent flanges 124 and 126 for rotatably receiving the spinner leg 116. A bead 128 maintains the spacing between the blade 118 and spacer leg 114. A pop rivet 130 may be interposed between the bottom flange 126 and the small L-bend 132 on the end of the spinner leg 116 to assure free spinning movement of the blade 118.

The difference from the prior art is evident in the hook leg 110. Like the spinnerbait 10, it includes a fixed leg portion 134 adjoined to a free end portion 136 by a flexible bend 138 of a cotter pin shape or such other shape that enables interchangable placement of the fish hook 140 thereon yet which prevents sliding movement of the head 68 past the flexible bend 138. The proportional length of the free end portion 136 relative to head 68 may be the same as illustrated in FIG. 3 in connection with spinnerbait 10 or it may vary so long as the free end portion 136 is movable to a position adjacent the fixed leg portion 134 for slidable movement of the head 68 to a hook retaining position over both leg portions. In the preferred embodiment the leg portions are received within the central longitudinal bore 70 through head 68.

Buzzbait 80 likewise includes an interference means such as second bend 142 strategically placed along the fixed leg portion 134 for resisting sliding movement of the head 68 from the hook retaining position. The angle formed by second bend 142 is between 20° and 70° and preferably between 40° and 50°.

A third bend 144 may be formed in the hook leg 110 between the second bend 142 and medial bend 106 to space the head 68 away from blade 118 to avoid interference with spinning movement of the blade. The angle of third bend 144 is preferably the same as second bend 142 but oppositely oriented so that the legs of the cotter pin bend are generally parallel to the spinner leg 116. The third bend 144 enables the second bend 142 to perform its function of resisting movement of the head from the hook retaining position while maintaining the general parallel relation of the cotter pin legs to the spinner leg 116.

The interchangeability of the fish hook 140 enables much variation such as replacement of the standard hook with the VMC offset hook 140 which enables an optional soft plastic trailer 146, shown in dotted lines in FIG. 5, to be attached in a manner that renders the buzzbait 80 essentially weedless. This method of attaching the trailer to a hook is called a Texas Rig. In the alternative an optional skirt 148 may be placed over the cotter pin bend 138 for a different look for buzzbait 80.

Whereas the invention has been shown and described in connection with preferred embodiments thereof it is understood that many modifications, substitutions and additions may be made which are within the scope of the appended claims.

I claim:

1. A bent wire fishing bait, comprising
   a bent wire including a medial bend for securement to a fish line and a pair of legs including a hook leg and a blade leg diverging outwardly from said medial bend,
   a blade rotatably connected to said blade leg for spinning movement of said blade,
   a head having an opening therethrough,
   said hook leg extending through said opening for slidably mounting said head on said hook leg,
   said hook leg including a fixed leg portion, a flexible bend and a free end portion joined to a fixed leg portion by said bend, said free end portion being of shorter length than said fixed leg portion and being bent back toward said fixed leg portion for replaceably receiving a fish hook on said flexible bend,
   said free end portion being movable to a position adjacent said fixed leg portion for slidable movement of said head to a hook retaining position over both leg portions, and
   interference means on said fixed leg portion for resisting sliding movement of said head from said hook retaining position.

2. The bent wire fishing bait of claim 1 wherein said interference means comprises a second bend in said fixed leg portion of said hook leg.

3. The bent wire fishing bait of claim 2 wherein said second bend is spaced from said flexible bend by a distance greater than the length of said opening in said head and being spaced from the end of said free end portion by a distance less than the length of said opening in said head.

4. The bent wire fishing bait of claim 3 wherein said head is axially slidable on said free end portion and fixed leg portion in the hook retaining position thereof.

5. The bent wire fishing bait of claim 2 wherein said second bend forms an angle between 20° and 70°.

6. The bent wire fishing bait of claim 3 wherein said second bend forms an angle of between 40° and 50°.

7. The bent wire fishing bait of claim 2 wherein said flexible bend in said hook leg comprises a cotter pin bend defining a partial loop having a width greater the width of said opening in said head for blocking movement of said head past said cotter pin bend.

8. The bent wire fishing bait of claim 7 wherein said medial bend in said bent wire is in the form of an R-bend.

9. The bent wire fishing bait of claim 7 wherein said bait comprises a spinnerbait, said blade leg having a free end and being generally straight but for an eyelet formed at the free end thereof, and further comprising a swivel connector connecting said blade to said eyelet.

10. The bent wire fishing bait of claim 9 wherein said hook leg and blade leg diverge outwardly at an angle of between 70° and 90°.

11. The bent wire fishing bait of claim 7 wherein said bait comprises a buzzbait, said blade leg having a free end and being generally J-shaped including a spacer leg extending generally perpendicular to said hook leg and a spinner leg connected to said spacer leg and extending toward said flexible bend generally parallel to said hook leg, said blade mounted for rotation about the axis of said spinner leg and having outer wings bent in opposite directions to cause spinning of said blade in response to movement of said buzzbait through water.

12. The bent wire fishing bait of claim 3 wherein said head is generally egg-shaped including a central bore along the longitudinal axis thereof.

13. The bent wire fishing bait of claim 12 wherein said head is made of steel material.

14. The bent wire fishing bait of claim 12 wherein said head is made of brass material.

15. The bent wire fishing bait of claim 9 further comprising an interlock snap connecting said blade to said swivel connector.

16. The bent wire fishing bait of claim 7 further comprising a fish hook mounted on said hook leg at said bend.

17. A spinnerbait, comprising a bent wire including a medial bend for securement to a fish line and a pair of legs including a hook leg and a blade leg diverging outwardly from said medial bend, said blade leg having a free end and being generally straight but for an eyelet formed at the free end thereof, a blade, a swivel connector connecting said blade to said eyelet, a head having an opening therethrough, said hook leg extending through said opening for slidably mounting said head on said hook leg, said hook leg including a fixed leg portion, a flexible bend and a free end portion joined to said fixed leg portion by said flexible bend, said free end portion being of shorter length than said fixed leg portion and being bent back toward said fixed leg portion for replaceably receiving a fish hook on said flexible bend, said free end portion being movable to a position adjacent said fixed leg portion for slidable movement of said head to a hook retaining position over both leg portions, and interference means on said fixed leg portion for resisting sliding movement of said head from said hook retaining position.

18. The bent wire fishing bait of claim 17 wherein said interference means comprises a second bend in said fixed leg portion of said hook leg, said second bend being spaced from said flexible bend by a distance greater than the length of said opening in said head and being spaced from the end of said free end portion by a distance less than the length of said opening in said head.

19. The bent wire fishing bait of claim 18 wherein said flexible bend in said hook leg comprises a cotter pin bend defining a partial loop having a width greater the width of said opening in said head for blocking movement of said head past said cotter pin bend.

20. A buzzbait, comprising a bent wire including a medial bend for securement to a fish line and a pair of legs including a hook leg and a blade leg diverging outwardly from said medial bend, said blade leg having a free end and being generally J-shaped including a spacer leg extending generally perpendicular to said hook leg and a spinner leg connected to said spacer leg and extending in the same direction as and generally parallel to said hook leg, a blade mounted for rotation about the axis of said spinner leg and having outer wings bent in opposite directions to cause spinning of said blade in response to movement of said buzzbait through water, a head having an opening therethrough, said hook leg extending through said opening for slidably mounting said head on said hook leg, said hook leg including a fixed leg portion, a flexible bend and a free end portion joined to said fixed leg portion by said flexible bend, said free end portion being of shorter length than said fixed leg portion and being bent back toward said fixed leg portion for replaceably receiving a fish hook on said flexible bend, said free end portion being movable to a position adjacent said fixed leg portion for slidable movement of said head to a hook retaining position over both leg portions, and interference means on said fixed leg portion for resisting sliding movement of said head from said hook retaining position.

21. A bent wire adapted for assembling a bent wire fishing bait including a head having an opening therethrough and a blade, said bent wire comprising:

a medial bend for securement to a fish line, a pair of legs including a hook leg and a blade leg diverging outwardly from said medial bend, said blade leg having an end portion adapted for a spinning connection of the blade thereto, said hook leg having a flexible bend and a free end portion joined to a fixed leg portion by said flexible bend, said free end portion being of shorter length than said fixed leg portion and being bent back toward said fixed leg portion for replaceably receiving a fish hook on said bend, said free end portion being movable to a position adjacent said fixed leg portion for slidable movement of said head to a hook retaining position surrounding both leg portions, said flexible bend being substantially wider than the combined thickness of said free end portion and fixed leg portion of said hook leg, thereby to block movement of said head past said flexible bend from the hook retaining position, and interference means on said fixed leg portion for resisting sliding movement of said head from said hook retaining position toward said medial bend;

whereby the free end portion springs outwardly from the fixed leg portion thereby allowing the fish hook to be removed without further manipulation of the free end portion once the head has been slid free of the free end portion.

22. The bent wire of claim 21 wherein said interference means comprises a second bend in said fixed leg portion of said hook leg.

23. The bent wire of claim 22 wherein said flexible bend in said hook leg comprises a cotter pin bend defining a partial loop having a width greater than the combined thicknesses of said free end portion and said fixed leg portion.

24. The bent wire of claim 23 wherein said bent wire comprises the bent wire of a spinnerbait, said blade leg having a free end and being generally straight but for an eyelet formed at the free end thereof, said eyelet being adapted for a swivel connection to a blade.

25. The bent wire of claim 23 wherein said bent wire comprises the bent wire of a buzzbait, said blade leg having a free end and being generally J-shaped including a spacer leg extending generally perpendicular to said hook leg and a spinner leg connected to said spacer leg and extending toward said flexible bend generally parallel to said hook leg.

* * * * *